United States Patent [19]
McCrary

[11] Patent Number: 4,810,754
[45] Date of Patent: Mar. 7, 1989

[54] HIGH TEMPERATURE PEROXIDE INDUCED TELOMERIZATION PROCESSES FOR GRAFTING VINYL NITROGEN CONTAINING MONOMERS ONTO OLEFIN POLYMERS

[75] Inventor: Thomas J. McCrary, Plainfield, N.J.

[73] Assignee: Exxon Research & Engineering Company, Florham Park, N.J.

[21] Appl. No.: 797,385

[22] Filed: Nov. 12, 1985

Related U.S. Application Data

[63] Continuation of Ser. No. 557,253, Dec. 2, 1983, abandoned.

[51] Int. Cl.$^4$ .................. C08F 4/32; C08F 255/02; C08F 255/04
[52] U.S. Cl. .................. 525/264; 252/50; 525/263; 525/279; 525/293; 525/309
[58] Field of Search ............... 525/263, 279, 293, 264

[56] References Cited

U.S. PATENT DOCUMENTS

| | | | |
|---|---|---|---|
| 3,179,715 | 4/1965 | Natta et al. | 525/263 |
| 3,301,837 | 1/1967 | Bartorelli et al. | 525/263 |
| 3,970,722 | 7/1976 | Ogihara et al. | 525/263 |
| 4,089,794 | 5/1978 | Engel et al. | 252/51.5 A |
| 4,134,927 | 1/1979 | Tomoshige et al. | 525/263 |
| 4,137,185 | 1/1979 | Gardiner et al. | 252/33 |
| 4,144,181 | 3/1979 | Elliott et al. | 252/33 |
| 4,219,432 | 8/1980 | Girgenti et al. | 252/51.5 A |
| 4,340,689 | 7/1982 | Joffrion | 525/263 |
| 4,358,564 | 11/1982 | Ames | 525/264 |
| 4,507,515 | 3/1985 | Johnston et al. | 585/12 |
| 4,517,104 | 5/1985 | Bloch et al. | 252/51.5 A |

FOREIGN PATENT DOCUMENTS 48-32584 6/1973 Japan ................... 525/263

*Primary Examiner*—Wilbert J. Briggs, Sr.
*Attorney, Agent, or Firm*—F. T. Johmann; M. B. Kapustij

[57] ABSTRACT

There are disclosed concentartion controlled, high temperature solution telomerization processes for graft copolymerizing ethylene alpha-olefin copolymers or forming acrylate copolymers, uti.lizing dialkyl peroxides at temperatures of 185°–250° C. wherein a molar excess of 3–10 moles of free radicals species are generated per mole of peroxide.

6 Claims, No Drawings

HIGH TEMPERATURE PEROXIDE INDUCED TELOMERIZATION PROCESSES FOR GRAFTING VINYL NITROGEN CONTAINING MONOMERS ONTO OLEFIN POLYMERS

This is a continuation, of application Ser. No. 557,253, filed 12/2/83, now abandoned.

The present invention relates to peroxide induced telomerization reactions. More particularly the invention relates to high temperature, peroxide initiated graft copolymerization and copolymerization processes conducted in solution at relatively high temperatures.

Peroxide initiated free radical grafting and polymerization reactions are well known in the art. Representative disclosures of free radical, peroxide initiated telomerization reactions are found in "Organic Reactions," Volume XIII, Chapter 3, New York: John Wiley & Sons, 1965, p. 91–121. C. M. Starks, "Free Radical Telomerization," New York: Academic Press, 1974, p. 24–31 and Hawkins, "Organic Peroxides," Van Nostrand, 1967 at p. 192–202 disclose, respectively, initiator efficiency and peroxide decomposition at elevated temperatures. U.S. Pat. No. 4,146,489 discloses free radical grafting of vinyl monomers onto ethylene copolymers, but at initial temperatures maintained below the initiation temperature.

It is generally accepted in the art that organic peroxide decomposition in free radical polymerizaton reactions proceeds by dissociation of the peroxide into alkoxy radicals, the peroxide being cleaved at the oxygen-oxygen bond. Studies of peroxide initiated free radical grafting reactions reported at the conventional grafting temperature of 60°–140° C. show that the percentage of grafting achieved decreases considerably with increasing temperature. The present invention is based upon the discovery that at very high temperatures of at least 190° C. and up to 250° C., the different free radical decomposition which occurs wherein a very large molar excess of free radical is generated is useful in carrying out highly effective grafting and copolymerization processes, which can be controlled directly through regulation of monomer concentration and peroxide initiator introduction rate.

In accordance with the present invention there have been discovered free radical, peroxide initiated telomerization processes for (a) graft copolymerizing vinyl-containing monomers, active methylene monomer, Diels-Alder dienophile compounds or mixtures of same onto ethylene alpha-olefin copolymers and terpolymers or (b) forming a copolymer from at least two monomers selected from the group consisting of acrylic or acrylate monomers of the formula CH$_2$=CH(R)—C(=O)—O—R', R being methyl or hydrogen and R' being a C$_1$-C$_6$ lower alkyl, and vinyl monomers which are copolymerizable with the acrylic or acrylate monomer by free radical initiation, at least one of said monomers being an acrylate, which comprises conducting said processes in solution or in a liquid polymer medium at temperatures of 190°–250° C. utilizing a dialkyl peroxide of the formula R'''-O-O-R''' wherein the R''' group has 3 to 6 carbon atoms and at least one t-butyl moiety wherein the peroxide during the course of said process decomposes to form 3 to 10 moles of free radicals per mole of peroxide introduced into the solution, the free radicals being characterized as not containing any alkoxy free radicals.

The invention is especially applicable to the graft copolymerization of a vinyl monomer with an ethylene-C$_3$-C$_{28}$ alpha-olefin copolymer having an M$_n$ of 700–500,000 and containing 30–80 wt % ethylene, with preferred ethylene copolymers being ethylene-propylene copolymers of M$_n$ equal to 10,000–250,000 and having 20–70 wt % ethylene. Such graft copolymerized products are especially useful as multifunctional dispersant-viscosity index improvers in lubricating oil compositions.

The invention is also applicable to ethylenes alpha-olefin terpolymers which contain less than about 10% by weight of a non-conjugated diene such as 1,4-hexadiene, dicyclopentadiene or ethylidenenorborbene and being in the same molecular weight range as the ethylene-alpha-olefin copolymers noted above. Ethylene-propylene-diene terpolymers (EPDM) constitute preferred materials for use in this invention.

In conducting the process of the present invention, for example in the graft copolymerization of 2-vinyl pyridine onto an ethylene propylene copolymer, the reaction is conducted at 190° C. in liquid media such as molten polymer or in an inert hydrocarbon solution, preferably a mineral oil using as the peroxide t-butyl peroxide. At these temperatures it has been found that the homopolymerization of 2-vinyl pyridine is substantially prevented by use of the high reaction temperatures and the common problems of functionalization of the oil by the monomer and crosslinking of the polymer are also substantially suppressed. The high concentration of free radicals generated at the high temperature has the effect of increasing the free radical initiator concentration enabling a much larger proportion of free radicals to be made available for abstraction of protons thereby causing the graft copolymerization to occur with substantially increased efficiency.

It has been found in accordance with this invention that the amount of vinyl pyridine that can be successfully grafted onto an ethylene propylene copolymer has been in creased by a factor of 500–600% compared with the same reaction conducted at conventional temperatures.

It is believed that at 190° C. and higher temperature the t-butyl peroxide will decompose to form the groups of free radical illustrated below:

C(CH$_3$)=CH.+HO.+3CH$_3$.+CO.

This plurality of free radicals will propagate the graft copolymerization process in favor of the formation of the graft copolymerized ethylene propylene 2-vinyl pyridine products due to the high concentration of free radicals. The temperature of the reaction, that is about 190°, inhibits the formation of vinyl pyridine homopolymer. The process is so effective under these conditions that no detectable vinyl pyridine polymer is observed and substantially 100% grafting efficiency is obtained. Additionally, no crosslinking of the polymer is observed.

In the grafting reaction, the degree of grafting and the size of the vinyl pyridine units attached to the ethylene propylene copolymer can be conveniently controlled by regulating the catalyst flow rate and the quantity of vinyl pyridine monomer introduced. Desirable graft products having 4–5 vinyl pyridine oligomeric units per site are prepared in the absence of both higher molecular weight polymerized vinyl monomer or any unreacted vinyl monomer.

A particularly advantageous feature of the process of the present invention as applied to grafting of nitrogen containing monomers with ethylene propylene copolymers is that the molecular weight of the substrate polymer remains substantially the same within the range of a change in thickening efficiency and sonic breakdown (ASTM D-2603) of not more or less than about 15%. This is a highly significant advantage with respect to the use of the grafted materials as lubricating oil additives and is an advantage over the disclosure of U.S. Pat. No. 4,146,489 which reports a deterioration in shear stability as a result of the grafting process which is an indication that substantial crosslinking has taken place. This requires an additional degradation step in order to provide a useful lubricating oil additive. The process of the present invention provides directly a finished grafted polymer in a useful molecular weight range.

The graft copolymerization process described above with specific reference to the use of 2-vinyl pyridine as the grafting monomer is equally applicable to any vinyl monomer as well as other monomers which contain an active methylene group and Diels-Alder dienophiles.

Other vinyl-containing monomers include styrene, butadiene, divinylbenzene, 4-vinyl pyridine and lower $C_1-C_8$ alkyl substituted C-vinylpyridines such as 2-methyl-5-vinyl pyridine, 2-vinyl-5-ethyl-pyridine and 2-vinyl-6-methylpyridine. Other examples of suitable vinyl containing monomers include dimethyl-aminoethyl methacrylate or acrylate, vinylimidazole, N-vinylcarbazole, N-vinylsuccinimide, acrylonitrile, o-,m-, or p-aminostyrene, maleimide, N-vinyl oxazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxobutyl] acrylamide, N-[1,2-dimethyl-1-ethyl-3-oxobutyl] acrylamide, N-(1,3-diphenyl-1-methyl-3-oxopropyl)acrylamide, N-(13-oxobutyl) methacrylamide, N,N-diethylaminoethyl acrylamide, and 2-hydroxyethyl acrylamide, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-methacryloxyethylmorpholine, N-maleimide of dimethylaminopropylamine, and the N-methacrylamide of aminoethylethyleneurea.

Monomers containing an active methylene group can be characterized as those monomers containing a —$CH_2$-unit which is adjacent to at least one strong electron withdrawing group such as sulfoxy, cyano, oxygen, carbamyl or an aromatic ring. Examples of such monomers having an active methylene group are 4-alkyl morpholine, 1,3-diphenyl-2-propanone, benzoyl acetonitrile, hydrocinnamonitrile, dibenzyl sulfoxide, ethylvinyl sulfone, alkylphenyl sulfone and 1,3-cyclohexanedione.

Diels-Alder dienophiles suitable in the graft copolymerization process of this invention are known in the art and may be characterized as monomers containing a double or triple bond conjugated with a carbonyl group or a nitrile group such as acrolein, crotonic aldehyde, acrylic acid, crotonitrile, acetylene dicarboxylic esters, quinones and vinyl ethers.

Copolymerization to prepare acrylate copolymers under peroxide initiated, free radical solution polymerization at the same temperatures constitutes the second telomerization process in accordance with the present invention. Copolymers of two or more monomers may be prepared at least one of which is an acrylate monomer of the formula $CH_2=CH(R)—C(:O)—OR'$, R being methyl or hydrogen and R' being a $C_1-C_6$ lower alkyl and the other monomer or monomers may be vinyl monomers such as acrylonitrile, 2-vinylpryidine or 4-vinylpyridine.

Similar to the graft copolymerization reaction, the copolymerization of two copolymerizable monomers, one of which is an acrylic or acrylate, is also conducted at 190°–250° C. in solution utilizing the same dialkyl peroxides. Again, due to the substantial molar excess of free radicals generated under these high temperature conditions, copolymers are formed having a composition directly controllable in a relationship which is linear with respect to the monomer proportions introduced into the reactor. Thus, a copolymer will be formed in alternating blocks which reflect accurately the ratio of copolymerizable monomers introduced, and this is regardless of the reactivity ratios of these monomers. These processes, therefore, are concentration controlled and this control is achieved by continuously introducing the copolymerizable monomers and the peroxide initiators into the solvent medium which is maintained at a temperature of at least 190° C. up to 250° C. By adjustment of the ratio of catalyst to monomers and the relative ratio of monomers to each other at a given temperature and monomer flow rate a copolymer of a designed molecular weight with alternating block compositions can be prepared. The process applies not only to copolymers of two monomers but interpolymers may be prepared containing three 3 or more different monomers and complex copolymers have been prepared which comprise nine different monomeric species in accordance with the process of this invention.

Besides the acrylic and acrylate monomers, the monomers copolymerizable therewith may generally be described as vinyl-containing monomers such as acrylonitrile, butadiene, styrene, vinyl chloride, vinylidene chloride, vinyl aromatic hydrocarbons as well as vinyl monomers containing carboxyl, amino, hydroxyl and oxirane functionality.

Illustrative monomers useful in preparing acrylate-containing copolymers in accordance with this invention are p-hexyl methacrylate, isobutyl methacrylate, 2,4-butadiene, maleic anhydride, methyl acrylate, methyl methacrylate, alpha-methylstyrene, vinyl acetate, n-butyl acrylate, butyl methacrylate, dibutyl fumarate, dibutyl maleate, styrene, ethyl acetoacetate, ethyl acrylate, 2-ethylhexyl acrylate ethyl methacrylate and the like.

A preferred embodiment is the preparation of the copolymer of methyl acrylate and acrylonitrile conducted at 190° C. in Solvent 100 Neutral mineral oil utilizing di-tbutyl peroxide catalyst. By adjustment of the monomer and catalyst ratios desired molecular weight ranges of this copolymer are effectively prepared.

The preferred peroxides for use in accordance with this invention are di-t-butyl peroxide and 2,5-dimethyl 2,5-di(t-butyl peroxyl)hexyne-3. Both these peroxides have the desired bulky alkyl substituent which will generate a substantial molar excess of free radicals at temperatures of 190° C. to 250° C. in solution.

It is within the scope of the present invention to generate the t-butyl peroxide in situ such as by employing a combination of t-butanol and any organic peroxide capable of abstracting a proton from t-butanol thereby providing in situ t-butyl peroxy moieties which will provide the free radical generation in accordance with this invention at temperatures of 190° C. to 250° C.

Conventional reactors may be employed in conducting the processes of this invention but the processes are considered especially suited for tubular reactors.

EXAMPLE 1

This example illustrates the preparation of a graft copolymerization of a vinyl monomer onto ethylene-propylene copolymer while conserving the molecular weight class of the starting ethylene-propylene copolymer and inhibiting homopolymerization of the vinyl monomer. Specifically, commercial grade 2-vinyl pyridine is grafted onto ethylene-propylene copolymer having a sonic breakdown of 32.2% when degraded in a sonic oscillator as per the test method described in ASTM D-2603. Additional physical properties of the starting ethylene-propylene copolymer pertinent to the molecular weight class are given in Table I.

A standard 30 gallon commercial batch reactor was equipped with an air jacketed addition tube opening below the liquid level of the reactor and in the propeller zone. Two separately metered 5 gal storage tanks were connected to a T-fitting followed by a one foot static mixer prior to entry into the air jacketed addition tube. Reagent flow rates were adjusted either by a differential setting of the pump rates of the two storage tanks or by dilution of the appropriate reagent in the storage tanks with Solvent 100 Neutral mineral oil (S-100-N) and using fixed pump rates for the two tanks or both.

To the 30 gallon reactor was charged 125 lbs of a 12 wt. % ethylene-propylene copolymer concentrate prepared from dissolving the ethylene-propylene copolymer in the Solvent S-100-N. The reactor was heated to 190° C. while sparging with nitrogen. At 190° C., the cooling air to the addition tube jacket was turned on and the reactor placed under a nitrogen blanket. To the monomer storage tank was charged 2.3 lbs of 2-vinyl pyridine and 8.0 lbs of S-100-N oil. The catalyst storage tank was charged with 0.8 lbs of di-t-butyl peroxide and 9.0 lbs of S-100-N oil. The catalyst pump was started followed immediately by the monomer pump. Each pump was set to deliver their respective contents over a 45 min period. During the course of the addition, the reactor temperature was maintained at 190°-195° C. At the end of the reagent addition, the reactor was allowed to cool rapidly to 150° C. under nitrogen sparge while 20.0 lbs of S-100-N oil was added to the reaction mixture producing a concentrate containing 9 wt. % of the graft ethylene-propylene copolymer.

A sample of the graft ethylene-propylene copolymer was isolated by dissolving 10 gms of the graft copolymer concentrate in 90 g of heptane. The heptane solution was then added dropwise with stirring to a beaker containing 600 ml of acetone. The graft ethylene-propylene copolymer precipitated and was collected by filtration. The acetone solution was concentrated on a rotary evaporator at 60° C. to give the isolated oil. The isolated graft polymer was dried in a vacuum oven at 70° C. for 24 hours prior to analysis. The analysis of the isolated graft ethylene-propylene copolymer are shown in Table I. It will be noted from the analysis data given in Table I, for example 1, that the % sonic breakdown and Thickening Efficiency (T.E.) of the graft copolymer is essentially unchanged from that of the starting ethylenepropylene copolymer. In addition, the viscosity at 212° F. for the graft copolymer is essentially the same as that found for a 9% solution of the starting ethylene-propylene copolymer further indicating no essential change in the molecular weight class of the graft ethylene-propylene copolymer. The nitrogen levels found for the graft ethylenepropylene copolymer shows 100% utilization of the 2-vinyl pyridine. This is consistent with only trace quantities of nitrogen found in recovered solvent oil either for a dig alysis sample or from solvent precipitation and from the overhead distillate obtained during the course of the reaction.

EXAMPLE 2

This example illustrates the graft copolymerization of a vinyl monomer onto ethylene-propylene copolymer giving a graft ethylene-copolymer of decreased molecular weight class and improved shear stability. Specifically, the same procedure and quantities of reagents were used as reagents were used as was described in Example 1 with the following process condition modifications: (a) during the course of the reagent addition the reactor temperature was slowly raised from 190°-225° C., and (b) the monomer pump rate was set to deliver the content of the monomer tank over a period of 2 hours and 15 minutes.

The graft ethylene-propylene copolymer produced was analyzed as was described in Example 1. The product analysis data are shown in Table I for Example 2. It will be noted that a graft ethylene-propylene copolymer is obtained containing essentially the same level of 2-vinyl pyridine as was obtained in Example 1 (% N). However the product produced in Example 2 was in a different molecular weight class as can be noted from the decreased viscosity obtained for the 9% AI concentrate solution at 212° F., the decreased thickening efficiency (1.71 vs. 2.68 for starting copolymer) and an increase shear stability as can be inferred from the decrease in the % sonic breakdown (14.58% vs. 32.21% for the starting copolymer). It is further noted that at higher temperature no homopolymer of 2-vinyl pyridine is detected and the ethylene-copolymer backbone is disproportionated toward lower molecular weight and not cross linked.

TABLE 1

|  | Example 1 | Example 2 |
|---|---|---|
| Starting Polymer Conc. | | |
| % Copolymer | 12% | |
| Viscosity @ 212° F. | 10,910 cs (1405 @ 9%) | Same Example 1 |
| T.E.[1] (Solvent ppt)[2] | 2.68 (purified) | |
| % Sonic Breakdown[3] | 32.21 | |
| Final Product | | |
| Concentrate (9% copolymer) | | |
| Viscosity @ 212° F. | 1381 cs | 364 cs |
| Haze (Nephelometer) | 35 | 19 |
| Sediment (vol. %/10 g/90 g heptane) | .025 | .025 |
| Solvent Precipitated Polymer | | |
| % N (Antek nitrogen analysis) | 0.14 | 0.17 |

TABLE 1-continued

|  | Example 1 | Example 2 |
|---|---|---|
| % N (potentiometric titration) | 0.12 | 0.13 |
| T.E. (solvent ppt) | 2.58 (purified) | 1.71 (purified) |
| % Sonic Breakdown | 31.56 | 14.58 |

[1]Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to $(M_n)$ and is a convenient, useful measurement for formulation of lubricating oils of various grades.
[2]Polymer isolated by precipitation of a hexane solution in acetone
[3]ASTM Test Procedure D-2603

EXAMPLE 3

This example illustrates the grafting of 2-vinyl pyridine to ethylene-propylene copolymer at a high graft level without crosslinking of the ethylene-propylene copolymer or homopolymerization of the 2-vinyl pyridine.

In a 2,000 ml resin kettle reactor equipped with a stirrer, baffles and an air jacketed addition tube was charged 1100 g of a 15% ethylene-propylene copolymer concentrate prepared from dissolving an ethylene-propylene copolymer with a Thickening Efficiency (T.E.) of 2.1 and % sonic breakdown of 17.3 (ASTM D-2603) in Solvent 100 Neutral mineral oil (S-100-N). The reaction mix was heated to 200° C. while sparging with nitrogen. To a storage reservoir connected to the air jacketed addition tube via a variable speed continuous addition syringe pump was charged the following mixture: 88 g of 2-vinyl pyridine, 20 g di-t-butyl peroxide, 40 g Solvent 100 Neutral mineral oil.

When the reaction mixture reached 200° C., the cooling air to the addition tube was turned on and the syringe pump started at a flow rate of 2 ml/min with the reactor under a nitrogen blanket. The reactor temperature was held to 200°-205° C. during the course of the addition. At the end of the reagent addition, the reactor was cooled to below 150° C. while sparging with nitrogen.

A sample of the graft ethylene-copolymer was isolated by dissolving 10 g of the final grafted copolymer concentrate in 90 g of heptane and the grafted copolymer precipitated by adding the heptane solution dropwise to 600 ml of acetone stirred in a beaker. The collected precipitated copolymer graft was redissolved in 60 ml heptane and further purified by precipitation from 600 ml of acetone. The isolated grafted copolymer was then dried in a vacuum oven at 70° C. for 24 hours. Analysis of the purified grafted ethylene-propylene copolymer was found to contain 0.76% N (Antek nitrogen analysis), a thickening efficiency of 1.96 and a % sonic breakdown of 16.34. The recovered isolated oil from the solvent precipitation contains only trace quantities of nitrogen ( 0.04%) and only trace quantities of 2-vinyl pyridine could be found in the overhead oil obtained during the course of the reaction.

EXAMPLE 4

Using the same equipment and procedures as described in Example 3, 1100 g of the same ethylene-propylene copolymer concentrate used in Example 3 was reactd with a mixture of 22 g 2-vinyl pyridine, 22 g n-decylmethacrylate, 2 g di-t-butyl peroxide and 100 g Solvent 100 Neutral mineral oil gave a grafted ethylene-propylene product when isolated and purified by solvent precipitation containing 0.30% N, % sonic breakdown was 17.0%.

EXAMPLE 5

Using the same equipment and procedures as described for Example 3, 1100 g of a 9% conc of ethylene-propylene copolymer concentrate prepared from dissolving an ethylene-propylene copolymer with a T.E. of 2.65 and a % sonic breakdown of 35.2 in Solvent 100 Neutral oil. The copolymer concentrate was reacted with a mixture containing 44 g of acrylonitrile, 44 g of di-t-butyl peroxide to give a graft copolymer product. A sample of the isolated grafted ethylene-propylene copolymer contained 0.36% N, a T.E. of 2.55 and a sonic breakdown of 31.8%.

EXAMPLE 6

This example illustrates the grafting of an active methylene compound onto ethylene-propylene copolymer. Using the sample equipment and procedures as described in Example 3. A 9% ethylene-propylene copolymer concentrate prepared from an ethylene-propylene copolymer having a T.E. of 2.65 and a sonic breakdown of 35.2% was reacted with a mixture of 42 g of diethyl-1,3, acetone dicarboxylate, 42 g of di-t-butyl peroxide and 375 g of Solvent 100 Neutral oil at a reaction temperature of 190°-200° C. The incorporation of diethyl-1,3-acetonedicarboxylate into the structure of the purified grafted ethylene-propylene copolymer was confirmed by the detection of only trace quantities of diethyl-1,3-acetonedicarboxylate in the distilled of the reaction overhead by standard gas chromatography methods and the presence of a strong carboxyl absorption frequency at 1740 cm$^{-1}$ in the infra-red spectrum of a thin film sample of the grafted ethylene-propylene copolymer.

EXAMPLE 7

This example illustrates the grafting of an active methylene and vinyl monomer mixture onto ethylene-propylene copolymer. Using the same ethylene-propylene copolymer concentrate and procedures as used in Example 6. A mixture of 48 g (0.45 moles) 2,6-butadiene, 15 g (0.224 moles) of acrylonitrile, 33 g of di-t-butyl peroxide and 32 g Solvent 100 Neutral oil was reacted with 1400 g of ethylene-propylene copolymer concentrate. The isolated and purified grafted ethylene-propylene copolymer was found to have the following elemental composition % C 85.62, % H 13.26%, % N 0.46.

EXAMPLE 8

Using the same procedures and equipment described for Example 3. A mixture of 25 g of vinyl acetate and 25 g of diethylfumarate was grafted onto 1100 g of the 9% ethylene propylene copolymer concentrate as used in Example 6. 30 g of di-t-butyl peroxide was used. The isolated graft adduct infra-red spectrum showed strong absorption band at 1750 cm$^{-1}$ indicating the presence of the carboxyl group in the polymer structure.

EXAMPLE 9

Using the procedure as described for Example 8, 1100 g of the 9% ethylene-propylene copolymer concentrate was grafted with a mixture of 25 g of 2-vinylpyridine, 25 g of vinyl acetate and 25 g of diethyl fumarate using 75 g of di-t-butyl peroxide. The purified graft copolymer adduct was found to have the following elemental composition: % C 85.42, % H 13.77, % N 0.24. An infra-red spectrum of the graft adduct showed a strong absorption at 1750 cm$^{-1}$ indicating the presence the carboxyl group incorporated into the copolymer structure. The sonic breakdown measured 30.15% (c.f. 35.2% for starting copolymer, Example 6).

EXAMPLE 10

This example illustrates the preparation of acylate copolymer under high temperature free radical solution polymerization. Using the equipment previously described in Example 3, 1100 g of Solvent 100 Neutral oil was charged to the reactor and heated with nitrogen sparging to 190° C. At 190° C. a mixture containing 50 g each of n-decylmethacrylate, methyl methacrylate, methyl acrylonitrile, and di-t-butyl peroxide was added at a flow rate of 1.7 ml/min. During the course of the addition the temperature was slowly raised from 190°–220° C. At the end of the addition, the reactor was rapidly cooled to 150° C. while sparging with nitrogen. Dialysis of the sample of the reaction product gave a 14% copolymer concentration.

What is claimed is:

1. A process of forming an oil-soluble V.I.-dispersant additive for lubricating oil comprising graft copolymerizing a vinyl nitrogen-containing monomer onto an ethylene alpha-olefin copolymer in solution in mineral oil at temperatures of 190° C. to 250° C. utilizing a dialkyl peroxide of the formula R'''—O—O—R''' wherein the R''' group has 3 to 6 carbon atoms and at least one t-butyl moiety, wherein the peroxide during the course of said process decomposes at said temperatures to form 3 to 10 moles of free radicals per mole of peroxide, wherein said dialkyl peroxide and said vinyl nitrogen-containing monomer are slowly added simultaneously to said oil solution of said copolymer while said solution is at 190° to 250° C. and wherein said ethylene alpha-olefin copolymer comprises 20 to 70 wt. % ethylene and has a number average molecular weight of about 10,000 to 250,000.

2. A process according to claim 1, wherein said vinyl monomer is selected from the group consisting of 2-vinyl pyridine, 4-vinyl pyridine and $C_1$ to $C_8$ alkyl substituted C-vinyl pyridine.

3. A process according to claim 1, wherein said ethylene alpha-olefin copolymer is an ethylene-propylene copolymer having 20–70 wt. % ethylene and an $\overline{M}_n$ molecular weight of 10,000–250,000; said monomer is a vinyl monomer selected from the group consisting of 2-vinyl pyridine and 4-vinyl pyridine; and said peroxide is t-butyl peroxide.

4. A process according to claim 3, wherein the molecular weight of the grafted ethylene-propylene copolymer product is within 15% of the molecular weight of the ethylene-propylene copolymer prior to grafting.

5. A process according to claim 3, wherein said peroxide is selected from the group consisting of di-t-butyl peroxide and 2,5-dimethyl 2,5-di(t-butyl peroxyl)hexyne-3.

6. A process according to claim 5, wherein said peroxide is di-tert-butyl peroxide and said nitrogen-containing monomer is 2-vinyl pyridine.

* * * * *